June 20, 1950     A. MARCHAND     2,512,209

BATHROOM FIXTURE MOUNTING

Filed Oct. 20, 1945

INVENTOR.
Adolph Marchand
BY

Patented June 20, 1950

2,512,209

UNITED STATES PATENT OFFICE 2,512,209

BATHROOM FIXTURE MOUNTING

Adolph Marchand, Jackson Heights, N. Y.

Application October 20, 1945, Serial No. 623,491

1 Claim. (Cl. 248—225)

1

The object of the present invention is to provide a bracket for supporting bathroom fixtures and the like, having a concealed mounting, the object of the invention being to provide adequate adjustment between the bracket and the mounting in such manner that a more secure and exact adjustment may be obtained with existing devices.

The invention will be described with reference to the accompanying drawings, in which—

Figure 1:
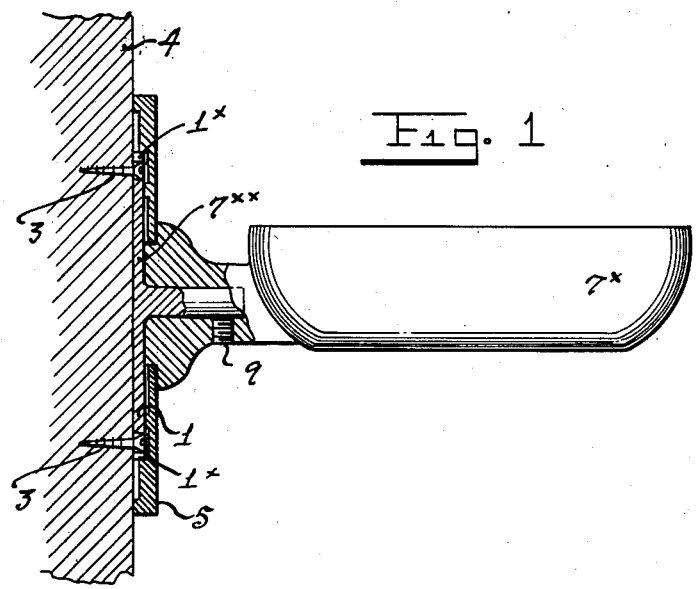
Figure 1 is a view in side elevation, partly broken away, showing a wall area, a mounting secured thereto by screws and a bracket embodying the invention secured in position, the bracket supporting a dishlike element, the latter being shown in fragmentary form.
Figure 2:
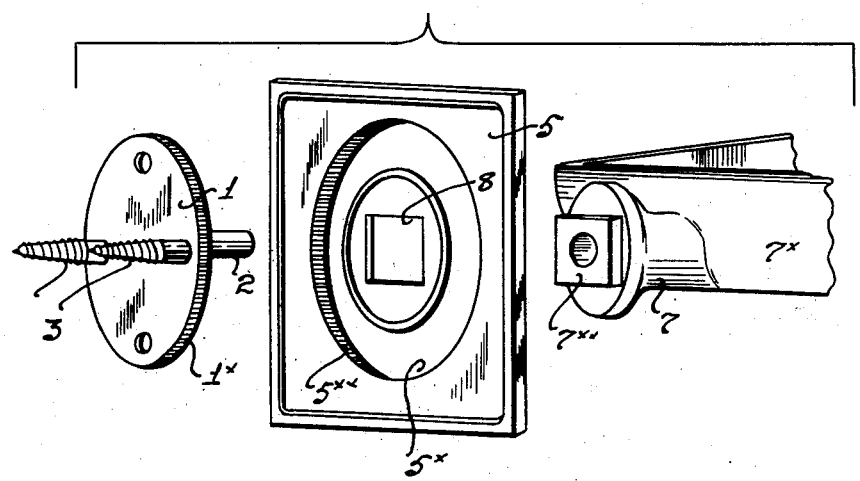
Figure 2 is a composite view in perspective of the members of the embodiment separated and ready for assembly.

Referring to the drawings, it will be seen that the bracket mounting, as best shown in Figures 1 and 2, comprises a disk 1 carrying a forwardly projected post 2. The disk is apertured to receive screws 3 by which it is attached to any suitable support such as the wall 4. The disk is employed in conjunction with a receiving plate 5, and bracket. In the embodiment shown the plate is a member separate from the bracket but the two may be unitary if desired.

The characteristic of the disk 1 is that it carries a plurality of fine peripherally disposed teeth similar to the milled edge of a coin, which teeth extend in ring formation entirely around the edge of the disk 1 as shown at 1x. The characteristic of the post is that it is a plain stud. The plate 5 may be of any desired form, a rectangular form being suitable as shown in Figure 2. It is formed with a socket at 5x to receive the disk, and surrounding the socket is a shoulder having fine teeth, as indicated at 5xx.

The teeth of the plate and the teeth of the mounting disk are adapted to interlock. The bracket, which may carry a soap dish 7x or any other suitable device, is formed as an arm 7 having a projection 7xx squared or otherwise angularly formed, to be recessed within a similarly formed opening at 8 in plate 5.

The plate 8 may be adjusted so that the bracket may hold the dish in truly horizontal position. When the bracket is thus lined up, rotation of a

2 set screw 9, threaded in an aperture in arm 7, will interlock the teeth, and the plate and bracket will be rigidly held against either outward or rotational movement.

It will be understood that the bracket may be of any desired form in order to adapt it for various holding purposes. Thus a single bracket may be used for holding a tumbler-receiving support, a soap dish, a tooth brush holder, etc., and two of the assembled members in spaced relation may hold between them a towel bar or a glass shelf, etc., etc.

By means of the invention, the plate may be rotated to carry the bracket to any desired position within 360°.

Having thus described my invention, and illustrated its use, what I claim as new and desire to secure by Letters Patent, is as follows:

A bathroom fixture mounting comprising a disk apertured to receive screws by which it may be attached to a support, the disk being formed with a plurality of peripherally disposed teeth similar to the milled edge of a coin, which teeth extend in ring formation around the edge of the disk, a post rigidly secured to the disk centrally thereof, in combination with a plate formed with a recess bounded by an annular wall area extending substantially at right angles to the face of the plate, said wall being formed with peripherally disposed teeth adapted to enter the spaces between the teeth of the disk, the plate wall at the recess being formed with an opening having angular sides, and a member adapted to be supported by said post exteriorly of the plate, said member having a projection angularly formed at its sides to engage the walls of the opening in the plate, and being centrally bored to receive said post, as and for the purpose set forth.

ADOLPH MARCHAND.

REFERENCES CITED

The following references are of record in the file of this patent:

UNITED STATES PATENTS

| Number | Name | Date |
|---|---|---|
| 1,276,463 | Wells | Aug. 20, 1918 |
| 1,773,815 | Hoegger | Aug. 26, 1930 |
| 1,962,739 | Hoegger | June 12, 1934 |
| 2,158,734 | Sladek | May 16, 1939 |